(12) United States Patent
Ke

(10) Patent No.: US 11,290,002 B2
(45) Date of Patent: Mar. 29, 2022

(54) POWER CONVERSION APPARATUS AND CHARGING METHOD THEREOF

(71) Applicant: Power Forest Technology Corporation, Hsinchu County (TW)

(72) Inventor: Po-Jen Ke, Taoyuan (TW)

(73) Assignee: Power Forest Technology Corporation, Hsinchu County (TW)

( * ) Notice: Subject to any disclaimer, the term of this patent is extended or adjusted under 35 U.S.C. 154(b) by 35 days.

(21) Appl. No.: 16/924,212

(22) Filed: Jul. 9, 2020

(65) Prior Publication Data

US 2021/0376713 A1    Dec. 2, 2021

(30) Foreign Application Priority Data

May 26, 2020   (TW) .................................. 109117485

(51) Int. Cl.
*H02M 1/36* (2007.01)
*H02M 3/335* (2006.01)

(52) U.S. Cl.
CPC ......... *H02M 1/36* (2013.01); *H02M 3/33592* (2013.01)

(58) Field of Classification Search
CPC ............................ H02M 1/36; H02M 3/33592
See application file for complete search history.

(56) References Cited

U.S. PATENT DOCUMENTS

| 6,438,009 B2 | 8/2002 | Assow | |
| 2011/0051464 A1* | 3/2011 | Lou | H02M 3/33592 363/21.02 |
| 2017/0033703 A1* | 2/2017 | Kikuchi | H02M 3/33592 |
| 2017/0272001 A1* | 9/2017 | Zong | H03K 5/08 |
| 2020/0389082 A1* | 12/2020 | Feng | H02M 1/36 |

FOREIGN PATENT DOCUMENTS

| CN | 103728572 | 4/2014 |
| TW | 201707361 | 2/2017 |
| TW | 202002492 | 1/2020 |

OTHER PUBLICATIONS

Office Action of Taiwan Counterpart Application, dated Apr. 16, 2021, pp. 1-5.

* cited by examiner

*Primary Examiner* — Thienvu V Tran
*Assistant Examiner* — Bart Iliya
(74) *Attorney, Agent, or Firm* — JCIPRNET

(57) ABSTRACT

A power conversion apparatus and a charging method of the power conversion apparatus are provided. A synchronous rectifier controller provides a voltage of a drain terminal of a synchronous rectifier transistor to charge a capacitor of a power supply terminal of the synchronous rectifier controller when the synchronous rectifier transistor is turned from an on state to an off state and a voltage of the power supply terminal is less than a preset voltage.

7 Claims, 3 Drawing Sheets

POWER CONVERSION APPARATUS AND CHARGING METHOD THEREOF

CROSS-REFERENCE TO RELATED APPLICATION

This application claims the priority benefit of Taiwan patent application serial no. 109117485, filed on May 26, 2020. The entirety of the above-mentioned patent application is hereby incorporated by reference and made a part of this specification.

BACKGROUND

Technical Field

The disclosure relates to an electronic apparatus, and particularly relates to a power conversion apparatus and a charging method thereof.

Description of Related Art

A power conversion apparatus is an indispensable element in modern electronic apparatuses. In a power conversion apparatus based on pulse width modulation (PWM) control, a secondary side of the power conversion apparatus usually has a rectifier diode. Since power consumption of the rectifier diode in an on state is relatively large, a synchronous rectifier transistor with a low on-resistance may serve to replace the rectifier diode. Under such a framework, a synchronous rectifier controller is needed for turning on or off the synchronous rectifier transistor on the secondary side.

Generally, the synchronous rectifier transistor may usually be disposed at an upper end or a lower end of the secondary side of a transformer of the power conversion apparatus. In a circuit framework where the synchronous rectifier transistor is disposed on the upper end of the secondary side of the transformer, two methods may be generally applied to provide working power required for the operation of the synchronous rectifier controller. The first method is to supply power to the synchronous rectifier controller through an auxiliary winding of the transformer, whereas such a method may lead to an increase in the cost of the transformer and an increase in the winding difficulty of the transformer. The second method is to supply power to the synchronous rectifier controller through a rectifier diode and a voltage regulating circuit by a primary winding on the secondary side of the transformer. However, such a method may lead to an increase in the power consumption when a voltage of the primary winding of the secondary side is high. Therefore, how to supply power to the synchronous rectifier controller and simultaneously prevent the increase in the cost and the overall power consumption of the power conversion apparatus is one of the issues to be solved by people skilled in the pertinent art.

SUMMARY

The disclosure is directed to a power conversion apparatus which may be formed without increasing the cost, and the overall power consumption of the power conversion apparatus is not increased.

An embodiment of the disclosure provides a power conversion apparatus including a transformer, a synchronous rectifier transistor, a capacitor, and a synchronous rectifier controller. The transformer includes a primary side winding and a secondary side winding, and a first end of the secondary side winding is coupled to ground. A source terminal of the synchronous rectifier transistor is coupled to a second end of the secondary side winding. The synchronous rectifier controller is coupled to a control terminal and a drain terminal of the synchronous rectifier transistor, a ground terminal of the synchronous rectifier controller is coupled to the source terminal of the synchronous rectifier transistor, and the capacitor is coupled between the ground terminal and a power supply terminal of the synchronous rectifier controller. The synchronous rectifier controller provides a voltage of the drain terminal of the synchronous rectifier transistor to charge the capacitor when the synchronous rectifier transistor is turned from an on state to an off state and when a voltage of the power supply terminal is less than a preset voltage.

In an embodiment of the disclosure, the synchronous rectifier controller provides the voltage of the drain terminal of the synchronous rectifier transistor to charge the capacitor when the synchronous rectifier transistor is turned from the on state to the off state within a preset period during which the synchronous rectifier transistor is turned from the on state to the off state and when the voltage of the power supply terminal is less than the preset voltage.

In an embodiment of the disclosure, the preset period ends before the synchronous rectifier transistor enters a next on state.

In an embodiment of the disclosure, when the voltage of the power supply terminal is greater than or equal to the preset voltage, the synchronous rectifier controller does not provide the voltage of the drain terminal of the synchronous rectifier transistor to charge the capacitor.

In an embodiment of the disclosure, the synchronous rectifier controller includes a switch and a voltage regulator. One end of the switch is coupled to the drain terminal of the synchronous rectifier transistor. The voltage regulator is coupled between the other end of the switch and the capacitor. The synchronous rectifier controller turns on the switch when the voltage of the power supply terminal is less than the preset voltage, so as to provide the voltage of the drain terminal of the synchronous rectifier transistor to the voltage regulator, and the voltage regulator charges the capacitor according to the voltage of the drain terminal of the synchronous rectifier transistor.

An embodiment of the disclosure provides a charging method of a power conversion apparatus. The power conversion apparatus includes a transformer, a synchronous rectifier transistor, a capacitor, and a synchronous rectifier controller, the synchronous rectifier transistor is coupled between a secondary side winding of the transformer and the synchronous rectifier controller, and the capacitor is coupled between a ground terminal and a power supply terminal of the synchronous rectifier controller. The charging method of the power conversion apparatus includes following steps. It is determined whether a voltage of the power supply terminal of the synchronous rectifier controller is less than a preset voltage when the synchronous rectifier transistor is turned from an on state to an off state. When the voltage of the power supply terminal is less than the preset voltage, a voltage of a drain terminal of the synchronous rectifier transistor is provided to charge the capacitor.

In an embodiment of the disclosure, the charging method of the power conversion apparatus includes determining whether the voltage of the power supply terminal of the synchronous rectifier controller is less than the preset voltage when the synchronous rectifier transistor is turned from the on state to the off state within a preset period during which the synchronous rectifier transistor is turned from the on state to the off state.

In an embodiment of the disclosure, the preset period ends before the synchronous rectifier transistor enters a next on state.

In an embodiment of the disclosure, when the voltage of the power supply terminal is greater than or equal to the preset voltage, the voltage of the drain terminal of the synchronous rectifier transistor is not provided to charge the capacitor.

In light of the foregoing, the synchronous rectifier controller provided in one or more embodiments of the disclosure may provide the voltage of the drain terminal of the synchronous rectification transistor to charge the capacitor at the power supply terminal of the synchronous rectifier controller when the synchronous rectifier transistor is turned from the on state to the off state and when the voltage of the power supply terminal is less than the preset voltage, so that the capacitor provides the working power sufficient for the normal operation of the synchronous rectifier controller, which effectively prevent the increase in the cost and the overall power consumption of the power conversion apparatus.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
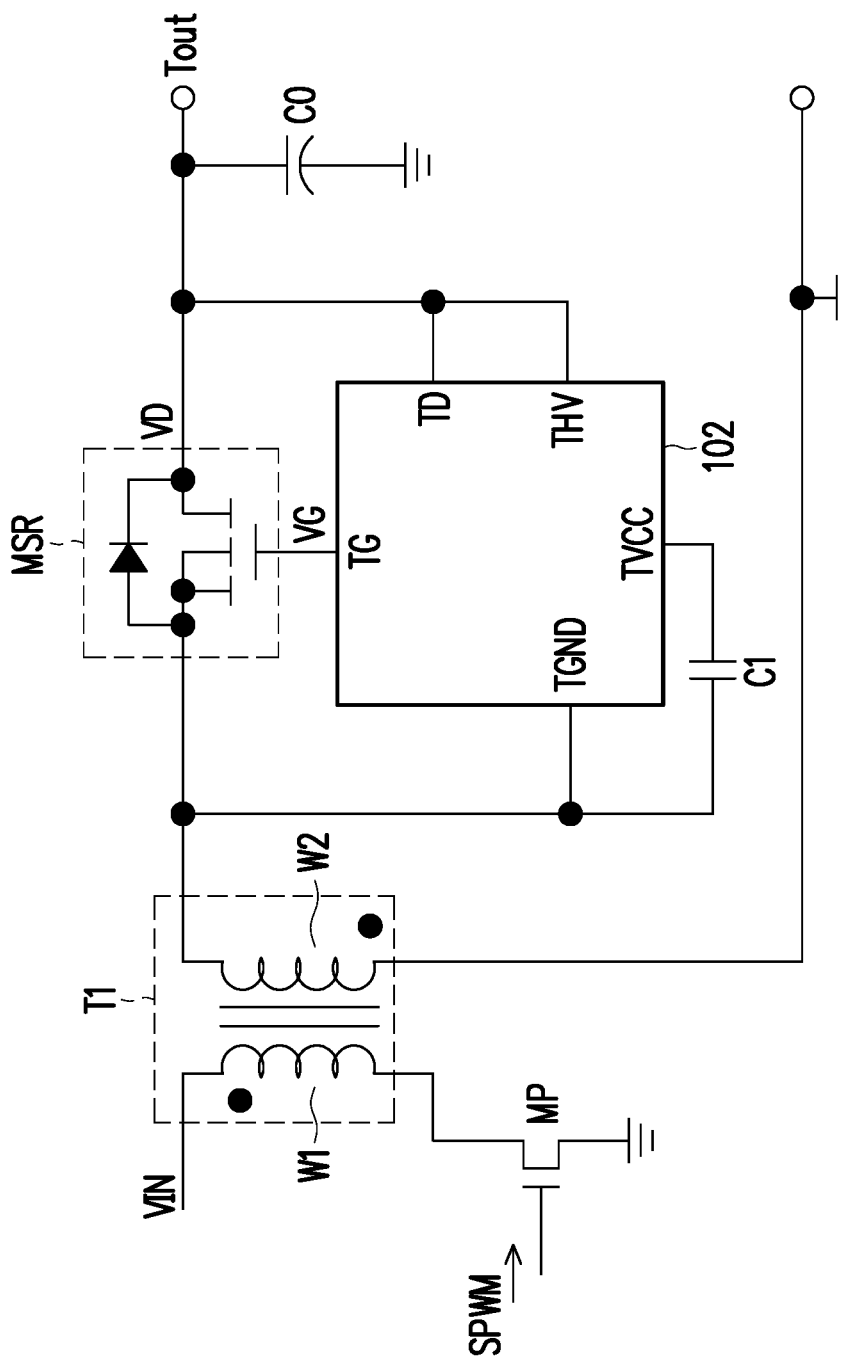
FIG. 1 is a schematic diagram of a power conversion apparatus according to an embodiment of the disclosure.

Reference will now be made in detail to the embodiments of the disclosure, examples of which are illustrated in the accompanying drawings. Wherever possible, the elements/components/steps using the same reference numerals in the drawings and embodiments represent the same or similar parts. Moreover, the term "couple" used in the specification may be "indirect couple" or "direct couple".

A framework of a power conversion apparatus of the disclosure may be a flyback type, a push-pull type, a forward type, a half-bridge type, a full-bridge type or other types of framework, the disclosure does not limit the framework of the power conversion apparatus. For simplicity's sake, the power conversion apparatus implemented in the flyback type is taken as an example for description, and other frameworks of the power conversion apparatus may be deduced by analogy.

FIG. 1 is a schematic diagram of a power conversion apparatus according to an embodiment of the disclosure. With reference to FIG. 1, a power conversion apparatus 100 includes a transformer T1 having a primary side winding W1 and a secondary side winding W2, a power switch MP, a synchronous rectifier transistor MSR, a capacitor C1, and a synchronous rectifier controller 102, but the present disclosure is not limited thereto. A first end of the primary side winding W1 receives an input voltage VIN, the power switch MP is coupled between a second end of the primary side winding W1 and ground, and a control terminal of the power switch MP receives a pulse width modulation signal SPWM. A first end of the secondary side winding W2 is coupled to ground, a second end of the secondary side winding W2 is coupled to a source terminal of the synchronous rectifier transistor MSR and a ground terminal TGND of the synchronous rectifier controller 102, a control terminal of the synchronous rectifier transistor MSR is coupled to an output terminal TG of the synchronous rectifier controller 102, and a drain terminal of the synchronous rectifier transistor MSR is coupled to a detection terminal TD, a voltage receiving terminal THV of the synchronous rectifier controller 102 and an output terminal Tout of the power conversion apparatus 100, and the capacitor C1 is coupled between the ground terminal TGND and a power supply terminal TVCC of the synchronous rectification controller 102. In an embodiment of the disclosure, the power conversion apparatus 100 may further include an output capacitor CO, and the output capacitor CO is coupled between the drain terminal of the synchronous rectifier transistor MSR and ground.

The transformer T1 may perform power conversion on the input voltage VIN, and output a voltage VD to a load (not shown) of the output terminal Tout of the power conversion apparatus 100 through the drain terminal of the synchronous rectifier transistor MSR. The synchronous rectifier controller 102 may generate a control signal VG according to the voltage VD to control a conduction state of the synchronous rectifier transistor MSR. For example, when the synchronous rectifier controller 102 detects that the voltage VD is lower than a preset voltage, the synchronous rectifier controller 102 may generate the control signal VG according to the voltage VD to maintain the synchronous rectifier transistor MSR in the on state to pull up the voltage VD back to the preset voltage, and after the voltage VD returns to the preset voltage, the synchronous rectifier controller 102 controls the synchronous rectifier transistor MSR to enter the off state. When the synchronous rectifier transistor MSR is turned from the on state to the off state, the voltage VD starts to have a resonance state. At this time, the synchronous rectifier controller 102 may determine whether a voltage of the power supply terminal TVCC (i.e., a voltage on the capacitor C1) is less than the preset voltage, and the preset voltage may be set to a voltage required for the operation of the synchronous rectifier controller 102, but the disclosure is not limited thereto. When the voltage of the power supply terminal TVCC is less than the preset voltage, the synchronous rectifier controller 102 may provide the voltage VD to the capacitor C1 to charge the capacitor C1, so that the voltage provided by the capacitor C1 is sufficient for the synchronous rectifier controller 102 to operate normally. Conversely, if the voltage of the power supply terminal TVCC is greater than or equal to the preset voltage, the synchronous rectifier controller 102 does not provide the voltage VD to the capacitor C1.

As such, the capacitor C1 is charged by the voltage VD that enters the resonance state, and it is unnecessary to additionally provide an auxiliary winding to supply power to the synchronous rectifier controller 102 as that does in the conventional technology, so that the cost of the transformer may be reduced without increasing winding difficulty of the transformer, and in addition, a problem of high power consumption caused by using a primary winding of the secondary side for supplying power is avoided. Moreover, since to charge the capacitor C1 with the voltage VD that enters the resonance state may reduce amplitude of the voltage VD in the resonance state, it may effectively preclude a situation that the synchronous rectifier controller 102 mistakenly turns on the synchronous rectifier transistor MSR due to the excessively low voltage VD.

Figure 2:
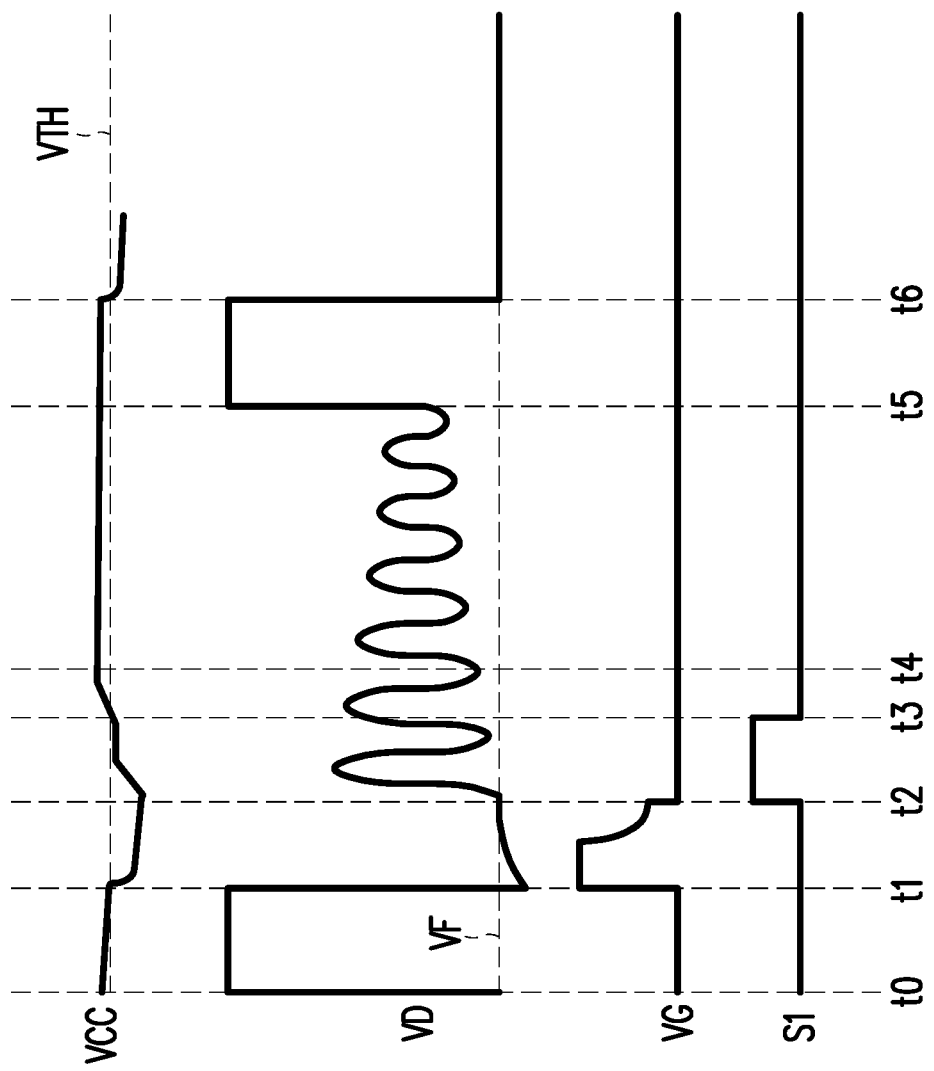
FIG. 2 is a schematic signal timing diagram of the power conversion apparatus.

The operation of the power conversion device 100 will be described in detail below. With reference to FIG. 1 and FIG. 2 at the same time, FIG. 2 is a schematic signal timing diagram of the power conversion apparatus 100. At a time t0, the power switch MP is controlled by the pulse width modulation signal SPWM to enter the on state, the input voltage VIN provides power to the primary side winding W1 of the transformer T1 for storing energy, at the same time, the synchronous rectifier transistor MSR is in the off state. A voltage that may be generated by the secondary side winding W2 is K×VIN, where K is a winding ratio between the secondary side winding W2 and the primary side winding W1 of the transformer T1.

At a time t1, the power switch MP is turned off in response to the pulse width modulation signal SPWM. The energy stored in the primary side winding W1 of the transformer T1 will be transferred to the secondary side winding W2 of the transformer T1, and at the same time, the voltage VD at the drain terminal of the synchronous rectifier transistor MSR will drop below a preset voltage VF. At this time, the synchronous rectifier controller 102 may generate the control signal VG according to the voltage VD to maintain the synchronous rectifier transistor MSR in the on state, so as to pull up the voltage VD back to the preset voltage VF, and after the voltage VD returns to the preset voltage VF, the synchronous rectifier controller 102 controls the synchronous rectifier transistor MSR to enter the off state (at a time t2). As shown in FIG. 2, at this time, the voltage VD enters the resonance state, and the synchronous rectifier controller 102 may determine whether the voltage VCC of the power supply terminal TVCC is less than a preset voltage VTH, and provide the voltage VD to the capacitor C1 to charge the capacitor C1 when the voltage VCC is less than the preset voltage VTH, where the preset voltage VTH may be, for example, a voltage required for the normal operation of the synchronous rectifier controller 102.

Figure 3:
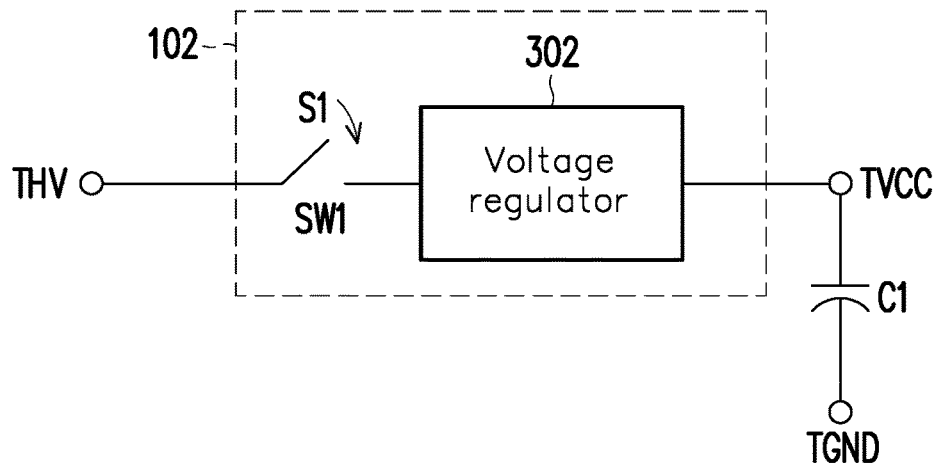
FIG. 3 is a schematic diagram of a synchronous rectifier controller according to an embodiment of the disclosure.

Furthermore, the method that the synchronous rectifier controller 102 provides the voltage VD to the capacitor C1 may be as shown in FIG. 3. In FIG. 3, the synchronous rectifier controller 102 may include a switch SW1 and a voltage regulator 302, where the switch SW1 is coupled between the voltage receiving terminal THV of the synchronous rectifier controller 102 (the drain terminal of the synchronous rectifier transistor MSR) and the voltage regulator 302, and the voltage regulator 302 is further coupled to the capacitor C1. The synchronous rectifier controller 102 may turn on the switch SW1 by outputting a control signal S1, so as to provide the voltage VD to the voltage regulator 302, and the voltage regulator 302 may regulate the voltage VD and output it to the capacitor C1 for charging, where the voltage regulator 302 may be, for example, a low dropout linear voltage regulator.

As shown in FIG. 2, the synchronous rectifier controller 102 may output the high-voltage level control signal S1 to turn on the switch SW1 during a period (a time period t2-t3) when the synchronous rectifier transistor MSR enters the off state and the voltage VCC of the power supply terminal TVCC is less than the preset voltage VTH, so as to charge the capacitor C1, and turn off the switch SW1 when the voltage VCC of the power supply terminal TVCC rises back to the preset voltage VTH, so as to stop charging the capacitor C1.

In some embodiments, in order to prevent an excessively long charging time of the capacitor C1, the synchronous rectifier controller 102 may provide the voltage VD to charge the capacitor C1 only within a preset period during which the synchronous rectifier transistor MSR is turned from the on state to the off state, and when the voltage of the power supply terminal TVCC is less than the preset voltage VTH, namely, outside the preset period, even if the voltage of the power supply terminal TVCC is less than the preset voltage VTH, the voltage VD is not provided to charge the capacitor C1. For example, in the embodiment of FIG. 2, the preset period may be a time period t2-t4, and the capacitor C1 is charged by the synchronous rectifier controller 102 only when the voltage of the power supply terminal TVCC is less than the preset voltage VTH within the time period t2-t4. The setting of the preset period is not limited by the embodiment. In other embodiments, the preset period may be shortened or extended according to actual needs, but it may only be extended up to the next time before the synchronous rectifier transistor MSR enters the on state. Namely, the preset period must end before a time t5 at the latest, so that an increase in power loss of the power conversion apparatus 100 may be avoided.

Figure 4:
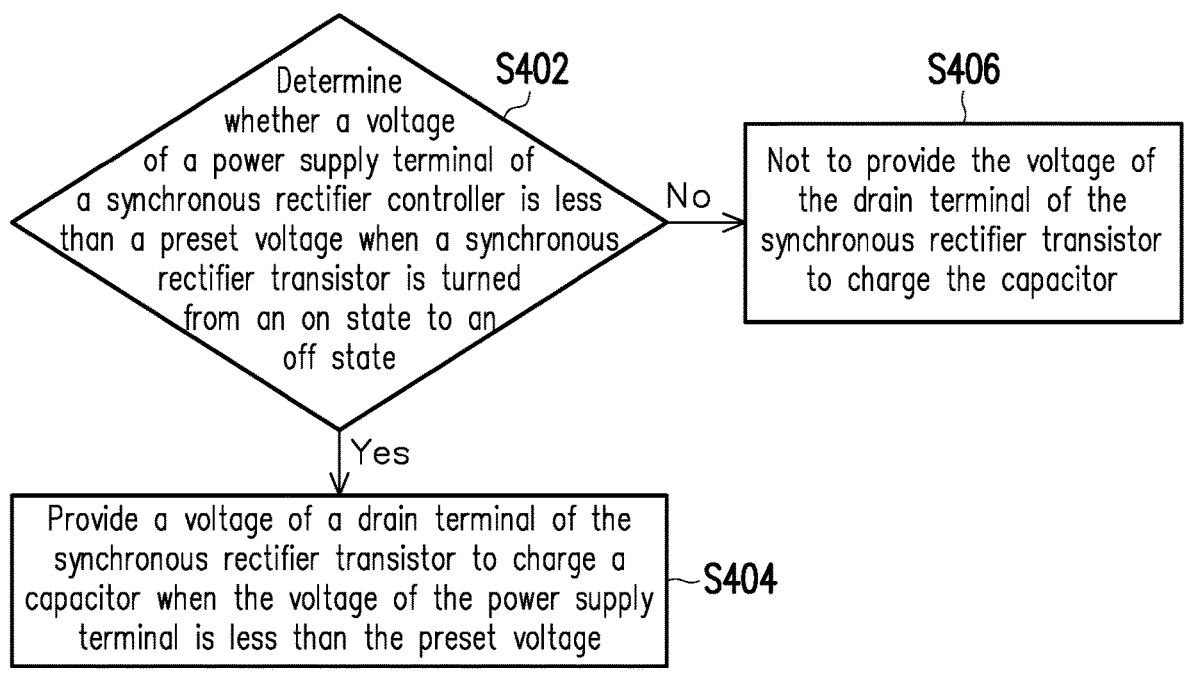
FIG. 4 is a flowchart illustrating a charging method of a power conversion apparatus according to an embodiment of the disclosure.

FIG. 4 is a flowchart illustrating a charging method of a power conversion apparatus according to an embodiment of the disclosure. Referring to FIG. 4, it may be known from the above embodiments that the charging method of the power conversion apparatus may include at least the following steps. First, it is determined whether a voltage of the power supply terminal of the synchronous rectifier controller is less than a preset voltage when the synchronous rectifier transistor is turned from an on state to an off state (step S402). If the voltage of the power supply terminal is less than the preset voltage, a voltage of the drain terminal of the synchronous rectifier transistor is provided to charge the capacitor (step S404), and if the voltage of the power supply terminal is greater than or equal to the preset voltage, the voltage of the drain terminal of the synchronous rectifier transistor is not provided to charge the capacitor (step S406). In some embodiments, it is also determined whether the voltage of the power supply terminal of the synchronous rectifier controller is less than the preset voltage only within a preset period during which the synchronous rectifier transistor is turned from the on state to the off state, where the preset period ends before the synchronous rectifier transistor enters a next on state, so as to prevent the increase in the power loss of the power conversion apparatus.

To sum up, the synchronous rectifier controller provided in one or more embodiments of the disclosure may provide the voltage of the drain terminal of the synchronous rectification transistor to charge the capacitor at the power supply terminal of the synchronous rectifier controller when the synchronous rectifier transistor is turned from the on state to the off state and when the voltage of the power supply terminal is less than the preset voltage, so that the capacitor provides the working power sufficient for the normal operation of the synchronous rectifier controller, which effectively prevents the increase in the cost and the overall power consumption of the power conversion apparatus.

It will be apparent to those skilled in the art that various modifications and variations can be made to the disclosed embodiment without departing from the scope or spirit of the disclosure. In view of the foregoing, it is intended that the disclosure covers modifications and variations provided that they fall within the scope of the following claims and their equivalents.

What is claimed is:

1. A power conversion apparatus, comprising:
 a transformer, comprising a primary side winding and a secondary side winding, wherein a first end of the secondary side winding is coupled to ground;
 a synchronous rectifier transistor, having a source terminal coupled to a second end of the secondary side winding;
 a capacitor; and
 a synchronous rectifier controller, coupled to a control terminal and a drain terminal of the synchronous rectifier transistor, a ground terminal of the synchronous rectifier controller being coupled to the source terminal of the synchronous rectifier transistor, the capacitor being coupled between the ground terminal and a power supply terminal of the synchronous rectifier controller, wherein the synchronous rectifier controller provides a voltage of the drain terminal of the synchronous rectifier transistor to charge the capacitor when the synchronous rectifier transistor is turned from an on state to an off state and when a voltage of the power supply terminal is less than a preset voltage,
 wherein the synchronous rectifier controller provides the voltage of the drain terminal of the synchronous rectifier transistor to charge the capacitor when the synchronous rectifier transistor is turned from the on state to the off state within a preset period during which the synchronous rectifier transistor is turned from the on state to the off state and when the voltage of the power supply terminal is less than the preset voltage.

2. The power conversion apparatus according to claim 1, wherein the preset period ends before the synchronous rectifier transistor enters a next on state.

3. The power conversion apparatus according to claim 1, wherein when the voltage of the power supply terminal is greater than or equal to the preset voltage, the synchronous rectifier controller does not provide the voltage of the drain terminal of the synchronous rectifier transistor to charge the capacitor.

4. The power conversion apparatus according to claim 1, wherein the synchronous rectifier controller comprises:
 a switch, having one end coupled to the drain terminal of the synchronous rectifier transistor; and
 a voltage regulator, coupled between the other end of the switch and the capacitor, wherein the synchronous rectifier controller turns on the switch when the voltage of the power supply terminal is less than the preset voltage, so as to provide the voltage of the drain terminal of the synchronous rectifier transistor to the voltage regulator, and the voltage regulator charges the capacitor according to the voltage of the drain terminal of the synchronous rectifier transistor.

5. A charging method of a power conversion apparatus, the power conversion apparatus comprising a transformer, a synchronous rectifier transistor, a capacitor, and a synchronous rectifier controller, the synchronous rectifier transistor being coupled between a secondary side winding of the transformer and the synchronous rectifier controller, the capacitor being coupled between a ground terminal and a power supply terminal of the synchronous rectifier controller, the charging method of the power conversion apparatus comprising:
 determining whether a voltage of the power supply terminal of the synchronous rectifier controller is less than a preset voltage when the synchronous rectifier transistor is turned from an on state to an off state; and
 providing a voltage of a drain terminal of the synchronous rectifier transistor to charge the capacitor when the voltage of the power supply terminal is less than the preset voltage,
 wherein determining whether the voltage of the power supply terminal of the synchronous rectifier controller is less than the preset voltage comprises:
  determining whether the voltage of the power supply terminal of the synchronous rectifier controller is less than the preset voltage when the synchronous rectifier transistor is turned from the on state to the off state within a preset period during which the synchronous rectifier transistor is turned from the on state to the off state.

6. The charging method of the power conversion apparatus according to claim 5, wherein the preset period ends before the synchronous rectifier transistor enters a next on state.

7. The charging method of the power conversion apparatus according to claim 5, wherein when the voltage of the power supply terminal is greater than or equal to the preset voltage, the voltage of the drain terminal of the synchronous rectifier transistor is not provided to charge the capacitor.

* * * * *